United States Patent [19]

Miller

[11] 4,155,989

[45] May 22, 1979

[54] REMOVAL OF NITRIC ACID FROM NITRIC ACID-SULFURIC ACID MIXTURES

[75] Inventor: Ralph Miller, Pleasantville, N.Y.

[73] Assignee: Ciba-Geigy Corporation, Ardsley, N.Y.

[21] Appl. No.: 851,584

[22] Filed: Nov. 14, 1977

[51] Int. Cl.$^2$ .................. C01B 17/90; C01B 17/82
[52] U.S. Cl. ..................... 423/523; 423/531
[58] Field of Search ................. 423/523, 524, 531

[56] References Cited

U.S. PATENT DOCUMENTS

| | | | |
|---|---|---|---|
| 1,561,985 | 11/1925 | Klencke | 423/531 |
| 1,617,212 | 2/1927 | Lamoreaux | 423/524 |
| 1,822,447 | 9/1931 | Merriam | 423/523 |
| 2,315,988 | 4/1943 | Somers et al. | 423/523 |
| 2,678,872 | 5/1954 | Kachkaroff | 423/523 |

FOREIGN PATENT DOCUMENTS

| | | | |
|---|---|---|---|
| 47-31518 | 8/1972 | Japan | 423/531 |
| 1066 of | 1904 | United Kingdom | 423/524 |
| 29568 of | 1912 | United Kingdom | 423/523 |
| 348866 | 5/1931 | United Kingdom | 423/531 |
| 883302 | 11/1961 | United Kingdom | 423/523 |

*Primary Examiner*—O. R. Vertiz
*Assistant Examiner*—Gary P. Straub
*Attorney, Agent, or Firm*—Wenderoth, Lind & Ponack

[57] ABSTRACT

Mixtures of nitric acid and sulfuric acid containing in excess of 70% sulfuric acid are denitrated by the addition of sufficient sulfur dioxide to such mixtures to convert the nitric acid to gaseous nitrogen oxides and vaporizing them from the solution in which they are formed. The process is particularly valuable for the treatment of spent nitration acids.

8 Claims, No Drawings

REMOVAL OF NITRIC ACID FROM NITRIC ACID-SULFURIC ACID MIXTURES

BACKGROUND OF THE INVENTION

Substantial volumes of mixtures, predominantly of sulfuric acid and nitric acid containing small percentages of nitric acid, are obtained from various commercially important chemical operations. The economic utilization of such mixtures is a continuing problem of the chemical industry. The actual concentrations of nitric acid and sulfuric acid in such mixtures vary. Many of these mixtures result from the treatment of organic compounds with nitrating mixtures which are blends of concentrated nitric acid and concentrated sulfuric acid. Nitrating mixtures of this kind are termed mixed acid. Standard mixed acids are articles of commerce. As a result of the treatment, the organic compound is converted to a nitro organic compound. In addition, there is formed a residual acid solution composed of the unconsumed nitric acid, all of the sulfuric acid originally present in the mixture, and the water which is the other principal product of the nitration reaction. The nitric acid concentration must be sufficient to obtain the desired nitrated product at the end of the reaction. This residual acid solution is termed spent nitration acid since it no longer has any nitration capability for the desired nitration reaction. It also always contains small concentrations of the desired product, by-products and other impurities.

Many nitration operations are of such a nature that the spent nitration acid can be economically processed to recover the unconsumed nitric acid at the same time the sulfuric acid is recovered. The recovered sulfuric acid can then be reconcentrated. As a result, both acids can be employed to make additional mixed acid. This processing generally consists of diluting the acid so that the sulfuric acid concentration remains below about 77%, fractionally distilling the nitric acid out of the mixture and recovering it, and subsequently reconcentrating the denitrated sulfuric acid.

Processing spent acid as described above is only economically feasible when very large volumes of spent acid are available and when the spent acid is free from extraneous substances which cause processing problems such as acid darkening, foaming, etc. In addition, the spent nitration acid must be free from substances which would cause the acid to be excessively corrosive to the materials of construction used in the fabrication of the expensive processing equipment needed to carry out the above process. Thus, spent nitration acid from the nitration of fluorine-containing organic compounds are especially difficult to process. They contain small concentrations of fluoride ion which make them corrosive to glass, ceramics, and tantalum, which are the best materials of construction for handling sulfuric acid and nitric acid.

Because of the special circumstances required to economically process spent nitration acid, at one time much spent acid was used in the fertilizer industry to acidulate phosphate rock. This is no longer possible unless special precautions are taken during the acidulation operation to prevent the escape of air polluting gaseous oxides of nitrogen. These form when phosphate rock is contacted by spent acid containing more than about 0.1% of dissolved nitric acid. Consequently, increasingly large amounts of spent acid now have to be treated with lime and the resultant calcium sulfate disposed of as land-fill. These operations are only permitted under circumstances where the drainage is so controlled that it cannot be the cause of water pollution.

It is obvious that any spent acid neutralization process cannot be regarded as satisfactory since it consumes alkali of one type or another and the acid value of the spent acid is lost simultaneously. The problem of the economic utilization of spent acid is becoming increasingly acute as environmental considerations become increasingly important. Various proposals have been advanced to mitigate this problem but none are as satisfactory as the present invention.

Thus, the present invention is concerned with spent nitration acid, and more specifically with the economic removal of its nitric acid content. The removal of the nitric acid makes the residual acid suitable for purposes for which the untreated spent acid could not be used.

THE PRIOR ART

The recent U.S. Pat. No. 3,749,648 to Boettler et al. describes a rather involved procedure for dealing with the spent acid resulting from the nitration of p-chlorobenzotrifluoride. The Boettler process obviously requires an elaborate plant capable of resisting the corrosive properties of hot sulfuric, nitric, nitrous and hydrofluoric acids. In addition, there is the expenditure of large amounts of energy in the form of steam. As explained above, the acid concentration is reduced below 77%; in this instance below 72%. As a result this acid can only be used to make additional mixed acid after it has been reconcentrated.

U.S. Pat. No. 3,677,701 to Hollingsworth et al. describes a procedure for ridding a fluorine-containing spent acid of its fluorine content prior to denitrating the spent acid by fractionally distilling out the nitric acid. The denitrated acid has a sulfuric acid concentration typically of 65–68%. (column 2, line 20).

U.S. Pat. No. 2,971,819 to Antelman employs acetylene to remove trace quantities of nitric acid from concentrated sulfuric acid by the addition of acetylene. It is not intended for the denitration of spent acid containing appreciable percentages of dissolved nitric acid.

U.S. Pat. No. 2,315,988 to Somers et al. employs ferrous sulfate to both reduce dissolved nitrogen oxides to nitrogen oxide, NO, and form a complex, $FeSO_4.NO$ dissolved in the acid. According to this reference, passing an inert gas through the solution containing the complex vaporizes the NO, thereby producing sulfuric acid with a diminished concentration of nitrogen oxides.

U.S. Pat. No. 2,198,686 to Watson employs urea for denitrating sulfuric acid containing small amounts of contaminating nitrogen oxides including nitric acid. The rationale appears to be the reduction of the oxides of nitrogen to nitrogen.

U.S. Pat. No. 2,355,702 to Brooks employs sulfamic acid or ammonium sulfamate to remove trace quantities of oxides of nitrogen from concentrated sulfuric acid in which they are dissolved.

It is known from Groves, British Pat. No. 348,866, May, 1931 to remove nitric acid from sulfuric acid of more than 60% concentration by adding thereto sulfur dioxide dissolved in sulfuric acid and passing a vigorous current of gas through the resultant mixture at a raised temperature for instance between 100° C. and 200° C. This reference also discloses that sulfuric acid whose concentration exceeds 60% cannot be freed from nitric acid by heating the acid to an elevated temperature. Passing a current of gas through the acid while it is at the elevated temperature is also ineffective. Treating the acid at an elevated temperature with a current of gas containing an excess of sulfur dioxide is also ineffective.

U.S. Pat. No. 2,955,920 to Belchetz discusses the problems of denitrating sulfuric acid in a system in which oxides of nitrogen, i.e. NO and $NO_2$, sulfur dioxide, sulfuric acid, air and carbonaceous matter are present. This reference states that effective denitration cannot be obtained at sulfuric acid strengths much above 70% owing to the stability of the chemical complex formed by $N_2O_3$ with $SO_3$ or $H_2SO_4$; see column 7, line 72 et seq. This finding is made even when the hot gas employed to denitrate the sulfuric acid contains a substantial percentage of sulfur dioxide, see table at top of column 4.

None of the above processes provide a truly satisfactory and economical method for the denitration of spent nitration acid so that the denitrated spent nitration acid can be economically utilized. Accordingly, it is an object of this invention to provide such a method.

It is a further object of this invention to effectively increase the concentration of the sulfuric acid by the conversion of sulfur dioxide to sulfuric acid substantially simultaneously as the denitration process proceeds.

A further object of this invention is to denitrate spent nitration acid at modest temperature levels.

SUMMARY OF THE INVENTION

These and other objectives are realized by the simple expedient of introducing a gas consisting essentially of sulfur dioxide into the spent nitration acid containing sulfuric acid and nitric acid. A sufficient quantity is used to convert the nitric acid to volatile nitrogen oxides and to assist the vaporization of the nitrogen oxides from the mixture. Although not certain, it appears that the conditions employed is this invention are such that the nitric acid is converted in large part to nitrogen oxide in accordance with the following reaction:

$2HNO_3 + 3SO_2 + 2H_2O = 2NO + 3H_2SO_4$

DETAILED DESCRIPTION OF THE INVENTION

In view of the many times in the past that $SO_2$ has been used to try to separate nitric acid from sulfuric acid whose concentration was 70% or higher, it was most surprising that the simple addition of sulfur dioxide to spent acid at ambient conditions resulted in an exothermic reaction followed by the evolution of nitrogen oxides to the point where the remaining nitrogen content, calculated as nitric acid, was less than 0.1%. Why the numerous processes of the prior art failed to achieve substantial denitration of spent acid by the simple addition of sulfur dioxide as described below is not understood. The possibility exists that never in the past was there a sufficiently high concentration of dissolved sulfur dioxide in the spent acid to achieve the results obtained by means of the present invention.

The Groves British Pat. No. 348,866, discussed above, appears to come closest to the present process. It is thought that Groves used such a dilute solution of $SO_2$ that the oxides of nitrogen which formed were contained in so much sulfuric acid that the acid was able to keep the gas dissolved. Only by heating and using an inert gas to sweep out the dissolved gas could the acid be made substantially free from oxides of nitrogen.

When dealing with a relatively small amount of spent acid it is economically attractive to generate the sulfur dioxide in situ by the addition of a solid sulfite or pyrosulfite such as an alkali metal or ammonium sulfite. By the addition of a solid sulfite or pyrosulfite such as the corresponding sodium or potassium salt directly to the vessel containing the spent acid, sulfur dioxide is generated directly in the acid, thereby insuring the best opportunity to have the sulfur dioxide dissolve. This procedure has the advantage of simplicity and diminished equipment requirement. It has the disadvantages of a more expensive source of sulfur dioxide, contamination of the acid with the corresponding sulfate and loss of some of the acid value.

The sulfur dioxide can also be added to the spent acid as a liquid. In many instances this is the preferred method of addition.

The present process is operable with dilute spent acid as well as concentrated spent acid. It is of especial advantage when dealing with spent acid containing 70% or more sulfuric acid. It is operable at concentrations of at least 94% and possibly at even higher concentrations. However, there are seldom instances when spent acid contains more than 94% sulfuric acid.

Although there is no limit to the amount of nitric acid that can be in the spent acid, the economic advantage of using this process is diminished when the nitric acid concentration is above about 10% and an appreciable amount of spent acid is available for processing. This process converts the nitric acid to gaseous oxides of nitrogen. It is not permissible to vent more than small amounts of oxides of nitrogen to the atmosphere since they are noxious pollutants. There are specific regulations dictating the amounts which can be released to the atmosphere. Consequently, the gaseous oxides of nitrogen released by the process must be absorbed by a suitable absorbent such as an aqueous alkali hydroxide or converted to nitrogen by admixture with a reducing flame. Obviously, the higher the nitric acid concentration in the spent acid, the greater the cost of the sulfur dioxide that is consumed and of the absorbent for the oxides of nitrogen. In view of these economic considerations, when the nitric acid concentration is about 10%, it becomes increasingly attractive to dilute the spent acid to about 70% acid and to recover the dissolved nitric acid by fractional distillation. Under these circumstances the value of the recovered nitric acid pays for the additional processing expense.

From the chemical equation postulated above, it is essential to employ at least enough sulfur dioxide in treating spent nitration acid to convert all of the nitric acid to nitrogen oxide. For maximum economy, all of the sulfur dioxide fed to the process should be dissolved in the spent acid. Different methods can be used to insure that the sulfur dioxide dissolves. The simplest method is to thoroughly mix liquid sulfur dioxide with the spent acid insuring that at all times, the amount of sulfur dioxide charged to the acid does not exceed the ability of the acid to dissolve sulfur dioxide at the temperature of the mixture. At a pressure of one atmosphere of sulfur dioxide, the solubility of sulfur dioxide in sulfuric acid at different concentrations and temperatures is known. For example, at about 20° C. about 5 grams of sulfur dioxide will dissolve in 95 grams of 55% sulfuric acid. At the same temperature only about 3 grams will dissolve in 90% acid. As the temperature rises, as is expected, the solubility of sulfur dioxide diminishes. For example, at 100° C., 90% sulfuric acid can dissolve less than 0.5% of its weight of sulfur dioxide.

These data may explain why the procedures employed in the past were ineffective. With the exception of the Grooves reference, all of the prior art procedures used a gas mixture containing a relatively small percentage of sulfur dioxide or an elevated temperature or both. As a result, it appears that under what would be economically feasible conditions, it was impossible to dissolve sufficient sulfur dioxide in the sulfuric acid to react with substantially all of the nitrogen compounds present to form volatile oxides which would vaporize from the acid solution.

It will be appreciated that the present invention is particularly valuable for increasing the sulfuric acid content of the denitrated spent acids.

This increase in concentration occurs as a result of the following:

1. Nitric acid is lost and the gaseous oxides of nitrogen vaporize.
2. Additional $H_2SO_4$ is formed from the $SO_2$.
3. Water is consumed by the reaction in which the $H_2SO_4$ is formed.

Even though interrelated, each of these happenings cause the final product to have a higher sulfuric acid concentration than that of the initial spent acid.

The invention will now be described with reference to the following Example.

To a one-liter, five-neck reaction flask equipped with blade stirrer, thermometer, and subsurface gas inlet tube with fritted glass tip was charged 632.2 grams $H_2SO_4$ 98% (reagent grade),
39.0 grams $HNO_3$ 71% (reagent grade) and
119.1 grams $H_2O$, Sulfur dioxide, evolved as a gas from the reaction of sodium sulfite and sulfuric acid, was condensed in a tared gas trap submerged in a dry ice-acetone bath. The tared gas trap was connected to the subsurface gas inlet tube of the reaction flask. The reaction flask was vented to an off-gas trap submerged in a dry ice-acetone bath. The $SO_2$ was allowed to boil and the gas delivered into the acid solution through the sub-surface gas inlet tube. Data in the following table were taken during the experiment.

Table I

| Time | Temp. (°C.) | Wt. $SO_2$ Added (gm) | % $HNO_3$[1] | % $H_2SO_4$[2] | Sample Wt. (gm) | Remarks |
|---|---|---|---|---|---|---|
| 9:40AM | 30 | 0 | 3.4 | 76.2 | — | Start $SO_2$ addition. |
| 10:00 | 29 | 21.1 | 3.4 | 77.7 | 25.9 | Colorless solution, no exotherm, no condensation in off-gas trap. Solution turned pale yellow. |
| 10:13 | 37 | | | | | Exotherm took place. Cooling reaction with dry ice-acetone bath. |
| 10:14 | 29 | | | | | Remove cooling bath. |
| 10:20 | 27 | 32.2 | 3.3 | 78.6 | 29.0 | Mild exotherm, no condensate in off-gas trap. $SO_2$ addition halted momentarily |
| 10:31 | 27 | 35.1 | 0.8 | 81.0 | | Solution turned dark blue. No condensate in trap. Foaming started. |
| | | $SO_2$ addition stopped | | Sample Taken | | |
| 10:40 | 28 | | | | | |
| 10:43 | 28 | | | | | Blue liquid condensing in off-gas trap, brown gas at trap outlet. |
| 10:50 | 29 | | | | | Brown gas still exiting trap. |
| 11:00 | 29 | 49.1 | 0.02 | 82.0 | 32.1 | Brown gas still exiting trap. |
| 11:25 | 29 | 71.4 | 0.02 | 82.4 | 26.7 | Acid solution now pale blue. |
| 11:40 | 28.5 | | | | | Acid solution now colorless, brown gas still exiting trap. |
| 11:50 | 28 | 95.4 | | | 31.6 | $SO_2$ depleted |

Wt. condensed off gas (intensely blue liquid) = 36.7 gm
Wt. Acid solution after $SO_2$ addition = 685.5 gm
[1]Total nitrogen as $NO_3$ - by Devarda Kjeldahl Dist. Analysis carried out next day. Devarda's Nitrate Method Scott's Standard Methods of Chemical Analysis-D.Van Nostrand Co.
[2]$H_2SO_4$ by difference from total acidity. Analysis carried out next day.

| MASS BALANCE DATA FOR EXPERIMENT AND DISCUSSION | |
|---|---|
| Acid Solution Charged | 790.3 gm |
| $SO_2$ Charged | 95.4 gm |
| Total In | 885.7 gm |
| Weight Acid Solution After $SO_2$ Addition | 685.5 gm |
| Total Weight Samples | 145.3 gm |
| Weight Condensed Off-Gas | 36.7 gm |
| Total Out | 867.6 gm |

Mass Balance = −18.2 gm

The initial colorless solution was yellow in color after the addition of about 0.7 moles of $SO_2$ for each mol of $HNO_3$ in the initial solution. In addition, the temperature rose as a result of an exothermic reaction. The solution in the reaction flask was cooled to its initial temperature of 29° C., a sample of the reaction mixture was taken and the $SO_2$ addition continued. By the time nearly 1.3 moles of $SO_2$ had been added to the solution for each initial mol of $HNO_3$, the acid mixture had turned dark blue. The $SO_2$ addition was stopped momentarily so that a sample could be taken. At this time there was no condensate in the off-gas trap. Soon after the $SO_2$ addition was resumed, the contents of the reaction flask began to foam vigorously, a few minutes later a blue liquid condensed in the off-gas trap and a brown gas was noted at the trap's outlet. The sample taken indicated about 75% of nitrogen originally in the acid mixture has disappeared.

The SO$_2$ addition was continued and by the time the next sample was taken, practically all of the nitrogen originally in the solution had been removed.

From these data and observations it appears that the initial change in color of the solution from colorless to yellow was due to the presence of dissolved NO$_2$ resulting from the dissociation of N$_2$O$_4$ that had been formed. N$_2$O$_4$ is quite soluble at room temperature in sulfuric acid. Continued addition of SO$_2$ caused the reduction of some of the NO$_2$ to NO which combined with NO$_2$ to form N$_2$O$_3$ which is an intensely blue liquid that is appreciably soluble in strong sulfuric acid. As the SO$_2$ addition continued, some passed through the solution. Simultaneously, NO and NO$_2$ vaporized. The mixture of SO$_2$ and N$_2$O$_3$ condensed in the off-gas trap as a blue liquid.

The SO$_2$ addition was continued until all of the initial liquid SO$_2$ has been vaporized and passed into the solution. Much of it passed through and condensed in the off-gas trap.

Very similar results were obtained when the initial temperature was 19° C. and rose to 45° C. and when the experiment was carried out at 68° C. None of these temperatures are critical and thus heating is unnecessary if an excess of SO$_2$ is employed.

When employing this invention, means should be provided to either absorb the volatilized oxides of nitrogen or to reduce them to nitrogen. Nearly always, means of one type of another are used to prevent the emission of oxides of nitrogen during the nitration reaction. These same means can be used in the nitric acid removal process to absorb or destroy the vaporized nitrogen oxides.

This invention can be carried out in various ways. As explained above, to insure maximum removal of nitric acid and oxides of nitrogen, sufficient sulfur dioxide must be dissolved in the sulfuric acid-nitric acid mixture to convert the nitric acid to nitrogen oxide. Since the sulfur dioxide must dissolve to react with the nitric acid, it is desirable, though not absolutely essential, to employ sulfur dioxide free from extraneous gas such as air or a mixture of air and nitrogen. If gaseous sulfur dioxide is used, it is desirable to contact the sulfur dioxide-containing gas at ambient temperature with the spent acid mixture to facilitate the dissolution of the sulfur dioxide in the liquid. It is counterproductive to contact the sulfur dioxide containing gas with the spent acid mixture at an elevated temperature since the liquid's ability to dissolve the sulfur dioxide is diminished.

In carrying out the process, enough sulfur dioxide should be employed so that the nitric acid-free residual sulfuric acid contains a small amount of dissolved sulfur dioxide. When this condition has been attained, it is desirable to heat the nitric acid-free residual sulfuric acid to vaporize the dissolved sulfur dioxide. The heating is to remove sulfur dioxide from solution; not to vaporize oxides of nitrogen, since these have already been removed.

One method of securing nitric acid removal from spent acid is to feed the spent acid at ambient temperature or a reduced temperature into the upper liquid inlet of an absorption tower. Concentrated sulfur dioxide, preferably free from extraneous gas is fed to the lower feed inlet of the absorption tower. Sufficient sulfur dioxide is used so that sulfur dioxide is contained in the nitric acid-free residual sulfuric acid before the acid leaves the tower from the tower's bottom liquid outlet. Prior to the acid leaving the tower at its bottom outlet or after the acid has left the tower, it is useful to heat the acid to a temperature close to 100° C. to vaporize the dissolved sulfur dioxide. If the acid is heated while it is still in the tower, the vaporized sulfur dioxide will rise in the tower counter-current to the descending cooler acid. Should the acid contain any dissolved nitrogen oxide, the upflowing sulfur dioxide will help to vaporize it. As the sulfur dioxide contacts cooler acid, it will dissolve. Should the cooler acid contain either nitric acid or nitrogen dioxide as such or in the form of N$_2$O$_3$, the sulfur dioxide will reduce it to nitrogen oxide.

By this device, an excess of sulfur dioxide is present in the sulfuric acid before it leaves the system and the loss of sulfur dioxide in the denitrated spent acid is minimized.

If the acid is heated after it leaves the tower, means should be provided so that the vaporized sulfur dioxide can return to the lower section of the tower at a location just above the tower's bottom liquid outlet.

To insure maximum denitration of spent acid, the residual acid should contain at least 0.05% free SO$_2$ subsequent to the completion of the reduction reaction.

I claim:

1. A process for treating a mixture containing sulfuric acid and nitric acid, the sulfuric acid concentration being in excess of about 70% and the nitric acid concentration, as determined by Devarda-Kjeldahl analysis being above 0.1% and below about 10%, which comprises: introducing a source of concentrated sulfur dioxide into said mixture, the molar ratio of sulfur dioxide to nitric acid being in excess of 1.5; reacting sulfur dioxide with said nitric acid without the addition of extraneous heat to evolve a gas consisting essentially of nitrogen oxides, then recovering sulfuric acid containing less than 0.1% nitric acid.

2. The process according to claim 1 wherein said process is performed at ambient temperature.

3. The process according to claim 1 wherein said mixture containing sulfuric acid and nitric acid is a spent nitrating acid.

4. The process according to claim 1 wherein the said sulfur dioxide source is gaseous sulfur dioxide.

5. The process according to claim 1 wherein said sulfur dioxide source is a sulfite wherein sulfur dioxide is generated in situ in said mixture by the addition of said sulfite to said mixture.

6. The process according to claim 5 wherein the sulfite is sodium or potassium sulfite.

7. The process according to claim 1 wherein said sulfur dioxide source is liquid sulfur dioxide.

8. The process according to claim 1 wherein the residual acid contains at least 0.05% of free sulfur dioxide subsequent to the completion of the conversion of the nitric acid to oxides of nitrogen.

* * * * *